Dec. 2, 1958            G. M. MOTIS            2,862,519
SWIRL AND SPRAY FITTING
Filed Feb. 14, 1955
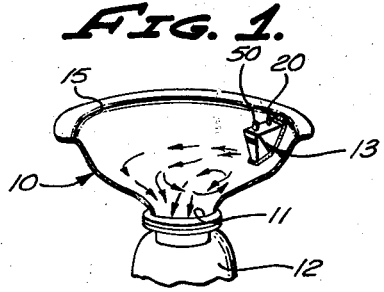
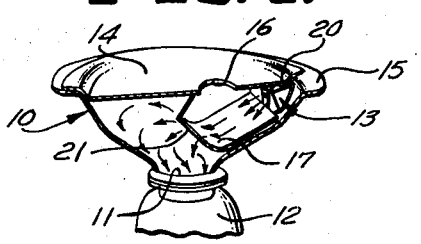
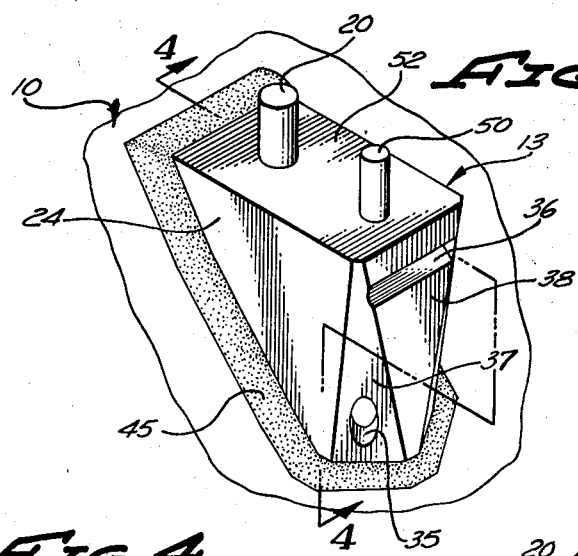
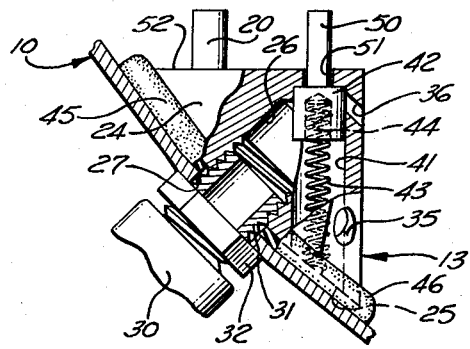
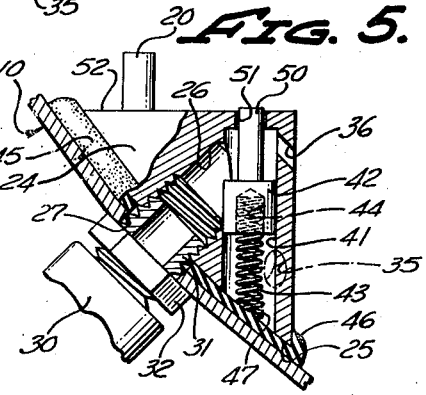
INVENTOR
GILBERT M. MOTIS
BY HIS ATTORNEYS
HARRIS, KIECH, FOSTER & HARRIS

United States Patent Office 2,862,519
Patented Dec. 2, 1958

2,862,519

SWIRL AND SPRAY FITTING

Gilbert M. Motis, Northridge, Calif., assignor to Waste King Corporation, Los Angeles, Calif., a corporation of California Application February 14, 1955, Serial No. 488,095

6 Claims. (Cl. 137—625.42)

The present invention relates to a sink appliance primarily adapted for use with an apparatus such as a garbage disposer, the invention being considered herein in connection with a garbage disposer for convenience.

It is conventional to provide a downwardly converging and preferably generally conical sink provided at its lower end with an outlet which communicates with the inlet of a garbage disposer so that garbage introduced into the sink is discharged into the disposer to be comminuted therein, the disposer preferably being attached to the lower end of the sink. Provided in the sink is a tableware trapping receptacle means or basin for retaining any tableware which may inadvertently be introduced into the sink so that such tableware is not discharged from the sink into the garbage disposer. Ordinarily the tableware trapping basin is carried by a cover for the sink, the cover being adapted to seat on the upper end of the sink and having an opening therethrough above and in alignment with the tableware trapping basin for the introduction of garbage into the sink.

The present invention comprises a valve means for introducing water into such a sink, including two alternative water outlets. The first water outlet is adapted to introduce water into the sink in a generally tangential direction to produce a swirling flow of water which spirals inwardly and downwardly to the outlet at the lower end of the sink so as to flush through the outlet any garbage which may be adhering to the sides of the sink. The second water outlet, when operated, is adapted to direct a generally fan-shaped jet of water at the tableware trapping basin when the cover carrying the basin is in place, such jet being so directed as to hydraulically displace garbage from the tableware trapping basin over a discharge lip or edge thereof into the sink to be comminuted by the garbage disposer, without, however, displacing out of the tableware trapping basin any tableware therein.

A primary object of the invention is to provide such a valve means having a plunger which is movable from a first position wherein it opens the first water outlet and closes the second water outlet to a second position wherein it opens the second water outlet and closes the first outlet, the plunger being actuable by an actuating means which is operative when the cover is in a predetermined position over the sink.

Another object is to provide means for biasing the plunger toward its first position so that, when the cover, and the tableware trapping basin carried thereby, are removed from the sink, the first outlet is opened and the second outlet is closed, whereby the lateral water discharge from the second outlet is terminated and the tangential water discharge from the first outlet is initiated to produce the swirling water flow hereinbefore discussed.

A further object of the invention is to provide such a valve means having a resilient base adapted to fit the valve means snugly to a sink and to close the bottom of the valve means.

An important object of the invention is to provide such a valve means which may be produced as a single unit and which is adapted to be installed in a sink by a single connection, and which may also be the source of the flow of water which the valve controls.

The foregoing objects, advantages and features of the present invention, together with other objects, advantages and features thereof which will become apparent, may be obtained with the exemplary embodiment of the invention illustrated in the accompanying drawing and described in detail hereinafter. Referring to the drawing:

Fig. 1 is an isometric view of an embodiment of the invention with the sink cover removed, showing a tangential stream of water;

Fig. 2 is a similar view of an embodiment of the invention with the sink cover in place, showing a radial stream of water;

Fig. 3 is an isometric view of the preferred embodiment of the valve means;

Fig. 4 is a sectional view taken along the line 4—4 of Fig. 3, showing the plunger in the first position; and Fig. 5 is a sectional view taken along the line 4—4 of Fig. 3, showing the plunger in the second position.

Referring now to Figs. 1 and 2, a sink 10 of generally conical configuration is shown having an opening 11 at the lower end thereof. A conventional garbage disposal unit 12 may be attached to the sink 10 at its lower end and is positioned below the opening 11 to receive garbage, liquid and other materials which may be introduced into the sink. The valve means 13 of the invention is mounted on the inner surface of a wall of the sink 10. In Fig. 1 a stream of water or other suitable liquid is being ejected tangentially into the sink from the valve means 13. The swirling motion of the stream of water as it flows around the sink and through the opening 11 cleans any garbage and other material from the inner walls of the sink 10 and washes it through the opening 11 into the disposal unit 12.

In Fig. 2 a cover 14 is positioned over the sink 10 and rests on a rim 15 of the sink. An opening 16 in the cover 14 provides access to the interior of the sink below. A receptacle 17 is attached to the underside of the cover 14 by upstanding flanges at opposite ends thereof and is positioned below the opening 16 so as to receive any material which may be passed through the opening 16 into the sink. A locating pin 20 is provided on the valve means 13, and a corresponding opening is provided in the cover 14. The cover 14 is placed over the sink 10 so that the locating pin 20 passes through the corresponding opening in the cover. This positions the receptacle 17 with respect to the valve means 13 so that a radially directed spray of water from the valve means, as seen in Fig. 2, will be directed into the receptacle 17. The water flows out of the receptacle 17 over a lip 21 and into the sink 10. Lighter particles, such as garbage and the like, which have been placed in the receptacle through the opening 16 will be floated out of the receptacle and into the sink over the lip 21 by the flow of water from the valve means. Heavier articles, such as tableware and the like, will not be floated away by the water and will remain in the lower portion of the receptacle 17.

A typical application of the invention is in restaurants, where the contents of used plates are scraped into the sink through the opening 16 of the cover. The food particles removed from the plates will be washed out of the receptacle 17 into the sink 10 and into the garbage disposal unit 12. Any tableware which may have inadvertently been left on the plates and scraped into the receptacle 17 will be trapped in the receptacle 17. Thus, damage both to the tableware and to the garbage disposal unit will be prevented. After the dishes have been scraped the cover may be removed to recover any tableware trapped in the receptacle. When the cover is removed, the type of water flow changes from the radial spray of Fig. 2 to the tangential swirl of Fig. 1 and the interior of the sink is washed clean.

The valve means 13 includes a valve body 24 having a surface 25 which is shaped to approximately correspond to the contour of the interior of the sink 10. An opening 26 in the surface 25 provides an inlet for water into the valve body 24. A portion of the opening 26 may be threaded to provide a means for attaching the valve to the sink. An opening 27 is provided in the wall of the sink 10 corresponding to the opening 26 in the valve body. The valve means may be mounted on the sink by a pipe fitting 30 which is provided with a hollow boss 31 having external threads mating with the internal threads in the opening 26. A locking nut 32 is first screwed onto the boss 31. Then the boss 31 of the fitting is inserted through the opening 27 in the sink and into the threaded portion of the opening 26 of the valve body. The valve body and the pipe fitting are locked in place by the locking nut 32 which is screwed up tight against the outer wall of the sink 10. A supply of water or other suitable liquid under pressure is supplied to the valve means through the pipe fitting 30.

A tangential outlet 35 and a radial outlet 36 are provided in the valve body 24 for directing the flow of water into the sink. The tangential outlet 35 is adapted to direct a stream of water in a tangential direction into the sink, and may consist of a passage in a face 37 of the valve body 24 having its longitudinal axis approximately tangential to the surface of the sink 10 at the point where the valve means is mounted on the sink. The radial outlet 36 is adapted to direct a stream of water radially into the sink and into the receptacle 17 when it is in place. It is preferable that the stream from the radial outlet be substantially fan-shaped so as to cover the surface of the water trapped in the receptacle 17. The radial outlet may consist of a passage in the form of a horizontal slot in the face 38 of the valve body, the axis of this passage pointing downward and toward the center of the sink.

A bore 41 within the valve body 24 intersects the opening 26 and provides paths for the flow of water from the opening 26 to either of the outlets 35 or 36. A plunger 42 is movably positioned within the bore 41. In Fig. 4, the plunger 42 is shown in its uppermost or first position, where it is blocking any flow between the bore 41 and the radial outlet 36. In Fig. 5 the plunger 42 is shown in its lower or second position, where it is blocking any flow of water from the inlet opening 26 to the tangential outlet 35. Spring means is provided for normally biasing the plunger 42 to the upper or first position. The spring means may consist of a coil spring 43 having one end thereof resting against the plunger 42 and the other end thereof resting against some fixed surface. In the embodiment of the invention illustrated a counterbore 44 is provided in the plunger 42 to receive one end of the spring 43.

A gasket 45 is provided for mounting between the valve body 24 and the inner wall of the sink 10. The gasket 45 may be made of suitable flexible material, such as rubber, and serves to provide a watertight connection between the valve body and the sink, to compensate for any irregularities occurring between the surface 25 and the inner wall of the sink, and to close and seal the lower end of the bore 41. The gasket 45 is shaped to match the contour of the surface 25 and is provided with a rim 46 which snaps over the periphery of the valve body 24 to secure the gasket to the valve body and retain the spring 43 in the bore 41. When the rim 46 is placed in position over the valve body 24 the gasket will be held in place against the surface 25. A projection 47 may be provided on the surface of the gasket 45 at the location where the spring 43 rests against the gasket. The projection 47 will extend into the spring 43 and serve to center the spring in the bore 41.

A rod 50 projects upwardly from the plunger 42 and extends through an opening 51 in the valve body 24 coaxial with the passage 41, but having a lesser cross-sectional area. When the plunger 42 is in its first position, as illustrated in Fig. 4, the rod 50 extends above the upper surface 52 of the valve body. When the cover 14 is placed in position on the sink and the locating pin 20 is in place in the cover, the lower surface of the cover will contact the rod 50 and push it and its connected plunger 42 downwardly into the second position shown in Fig. 5. Thus it is seen that when the cover 14 is in place on the sink, the tangential outlet 35 will be closed and the radial outlet 36 will be opened, directing the stream of water radially into the sink and the receptacle. However, when the cover 14 is removed the spring 43 will bias the plunger 42 to its first position, in which the radial outlet 36 will be closed and the tangential outlet 35 will be opened, directing a stream of water tangentially into the sink and thereby cleaning out the sink with the swirling action of the water.

While I have disclosed an exemplary embodiment of my invention herein for the purposes of illustration, it will be understood that various changes, modifications, and substitutions may be incorporated in such embodiment without necessarily departing from the spirit of the invention as defined by the claims of the patent.

I claim as my invention:

1. A valve which is adapted to be mounted on the wall of a generally conical sink, including: a body member having a mounting base and having an inlet bore substantially normal to said base and a plunger bore intersecting said inlet bore, and having a first outlet opening communicating with one end of said plunger bore and directed in one lateral direction with respect to said plunger bore, and having a second outlet opening communicating with the other end of said plunger bore and directed in a different lateral direction with respect to said plunger bore; plunger means in said plunger bore and adapted to be moved from a first position in which it opens said first outlet opening and closes said second outlet opening to a second position in which it closes said first outlet opening and opens said second outlet opening; spring means for biasing said plunger means in one direction in said plunger bore; an actuating rod connected to said plunger means and extending from said valve body whereby said plunger means may be moved in the opposite direction in said plunger bore; and resilient gasket means covering said base, said gasket means having a peripheral lip adapted to fit over the periphery of said base to connect said gasket means to said valve body.

2. A valve which is adapted to be mounted on the wall of a generally conical sink, including: a body member having a mounting base and having an inlet bore substantially normal to said base and a plunger bore intersecting said inlet bore, and having a first outlet opening communicating with one end of said plunger bore and directed in one lateral direction with respect to said plunger bore, and having a second outlet opening communicating with the other end of said plunger bore and directed in a different lateral direction with respect to said plunger bore, said inlet bore being internally threaded to receive a standard pipe fitting for clamping said body member in position, plunger means in said plunger bore and adapted to be moved from a first position in which it opens said first outlet opening and closes said second outlet opening to a second position in which it closes said first outlet opening and opens said second outlet opening; spring means for biasing said plunger means in one direction in said plunger bore; and an actuating rod connected to said plunger means and extending from said valve body whereby said plunger means may be moved in the opposite direction in said plunger bore.

3. A valve which is adapted to be mounted on the wall of a generally conical sink having a tableware receptacle therein and a cover removably positioned thereover, said valve including: a valve body having a shaped mounting face; an inlet in said face, said inlet comprising a threaded opening adapted to receive a fitting which clamps said valve body in position and also supplies liquid under pressure to said inlet; a first outlet to direct a stream of liquid outward from said valve in a first direction; a second outlet to direct a stream of liquid outward from said valve in a second direction; a plunger guide in said valve body, said guide comprising another opening in said face having a vertical longitudinal axis, said other opening extending completely through said valve body and consisting of a lower section and an upper section, said upper section having less cross-sectional area than said lower section; a plunger mounted in said plunger guide, said plunger having an upper portion extending above said valve body and being movable vertically between a first position wherein it opens said first outlet and closes said second outlet and a second position wherein it closes said first outlet and opens said second outlet; gasket means of flexible, water-resistant material, said gasket means covering said face except for an aperture corresponding to said threaded opening, and having a rim resiliently holding said gasket means to said valve body; and spring means located in said plunger guide, said spring means resting against said gasket means and urging said plunger toward said first position.

4. A valve as defined in claim 3 in which said gasket means includes a portion thereof projecting into said plunger guide and engaging said spring means.

5. A valve as defined in claim 3 in which said second outlet is positioned in said valve body at the point where said valve guide cross-sectional area changes, whereby the flow of liquid from said inlet to said second outlet is not shut off until said plunger has substantially completed its movement in response to the urging of said spring means.

6. A valve which is adapted to be mounted in a sink, said valve including: a valve body having a shaped mounting face; a fluid inlet passage; a plurality of outlets to direct streams of liquid outward from said valve; a plunger receiving bore providing fluid communication between said fluid inlet passage and said outlets; a plunger slidably positioned within said valve body in said bore whereby said plurality of outlets may be individually opened and closed; a gasket, including a rim resiliently clamping said gasket to said face; and spring means mounted between said plunger and said gasket, said gasket including seat means for locating one end of said spring means thereon, said spring means urging said plunger toward a first position in which at least one of said outlets is open.

References Cited in the file of this patent

UNITED STATES PATENTS

| | | |
|---|---|---|
| 1,653,613 | Bast | Dec. 27, 1927 |
| 1,763,877 | Bowlzer | June 17, 1930 |
| 1,878,097 | Bletcher | Sept. 20, 1932 |
| 2,516,208 | Hasbany | July 25, 1950 |
| 2,771,904 | Sherman et al. | Nov. 27, 1956 |